(12) United States Patent
Xu et al.

(10) Patent No.: US 7,425,681 B2
(45) Date of Patent: Sep. 16, 2008

(54) DECORATIVE SWITCH ASSEMBLY

(76) Inventors: Shaojie Xu, 8808 W. 125th St., Overland Park, KS (US) 66213; Hui Xu, Rm # 401, Building #8, No. 768 Gong Ping Road (Dong Fang Du Shi), Shanghai (CN) 200086

( * ) Notice: Subject to any disclaimer, the term of this patent is extended or adjusted under 35 U.S.C. 154(b) by 0 days.

(21) Appl. No.: 11/450,589

(22) Filed: Jun. 12, 2006

(65) Prior Publication Data
US 2007/0284128 A1   Dec. 13, 2007

(51) Int. Cl.
*H02G 3/14* (2006.01)
(52) U.S. Cl. .................... 174/66; 174/67; 220/241
(58) Field of Classification Search ............ 174/66, 174/67; 220/241, 242; D8/353; D13/177; 312/328
See application file for complete search history.

(56) References Cited

U.S. PATENT DOCUMENTS

| | | | |
|---|---|---|---|
| 3,119,895 A * | 1/1964 | Pahner ..................... 174/5 |
| 3,953,933 A | 5/1976 | Goldstein |
| 4,631,354 A | 12/1986 | Boteler |
| 4,800,239 A | 1/1989 | Hill |
| 4,835,343 A | 5/1989 | Graef et al. |
| 5,073,681 A | 12/1991 | Hubben et al. |
| D327,212 S | 6/1992 | Hubben et al. |
| 5,153,816 A | 10/1992 | Griffin |
| 5,180,886 A | 1/1993 | Dierenbach et al. |
| 5,189,259 A | 2/1993 | Carson et al. |
| 5,456,373 A * | 10/1995 | Ford ....................... 220/242 |
| 5,675,125 A * | 10/1997 | Hollinger ................. 174/66 |
| 5,723,817 A | 3/1998 | Arenas et al. |
| 6,281,440 B1 | 8/2001 | Baldwin et al. |
| 6,679,725 B2 | 1/2004 | Kidman |

OTHER PUBLICATIONS

U.S. Appl. No. 10/910,122, Xu Shaojie.
U.S. Appl. No. 10/973,902, Xu Shaojie.

* cited by examiner

*Primary Examiner*—Dhiru R Patel

(57) ABSTRACT

A decorative switch assembly for outlet boxes wherein the switch actuator and the face plate are metallic and screwless. The assembly is grounded by using U-shaped sheet metals.

1 Claim, 6 Drawing Sheets

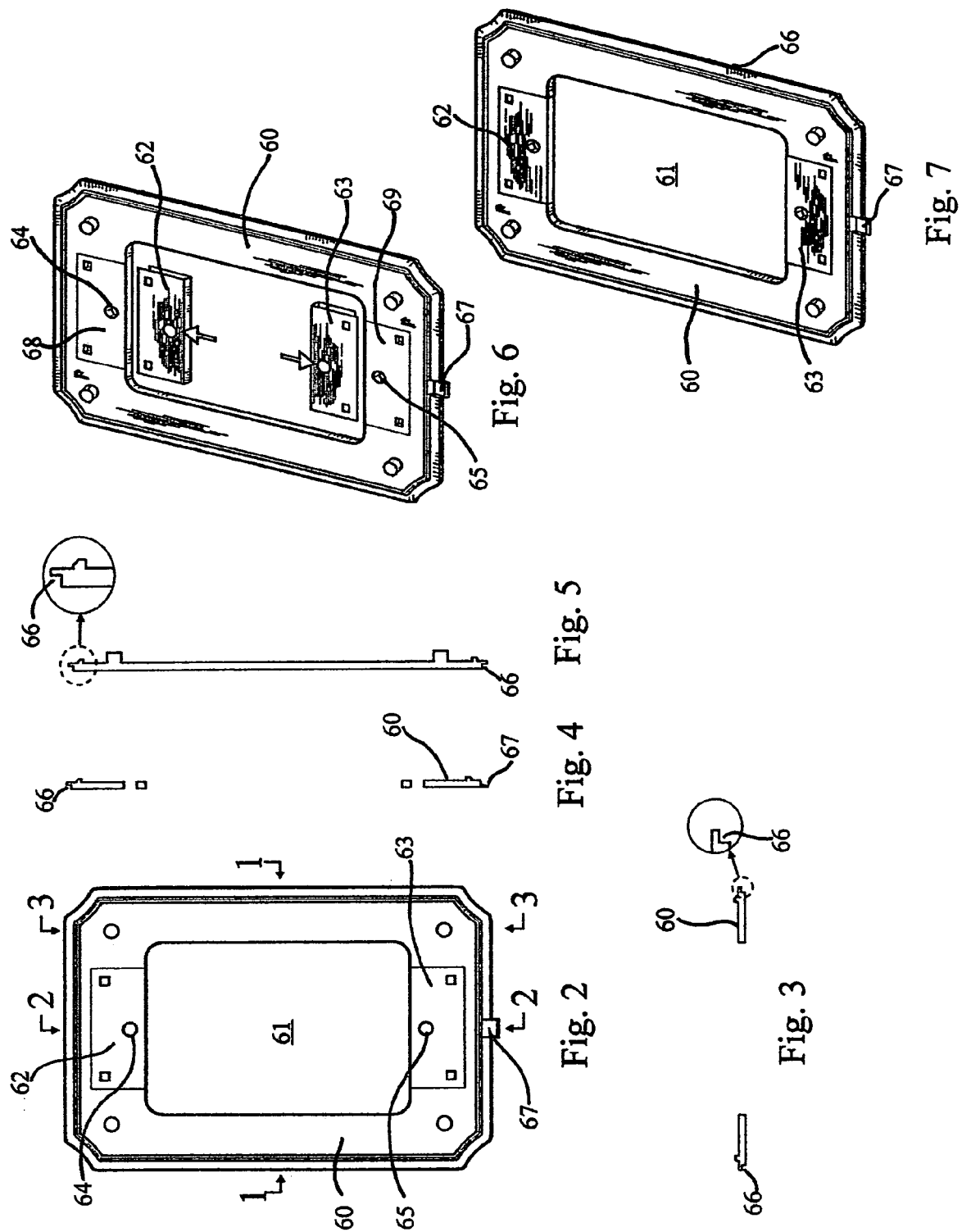

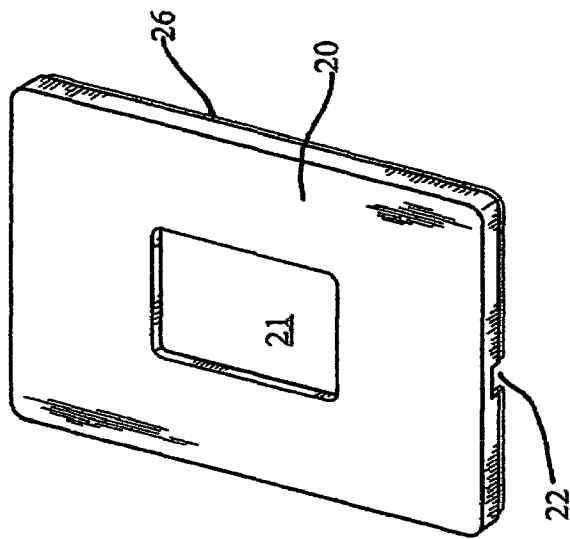
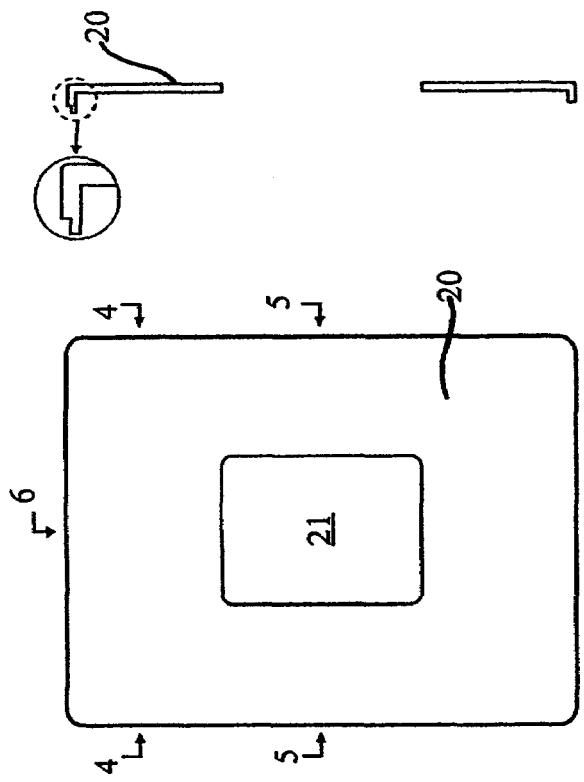
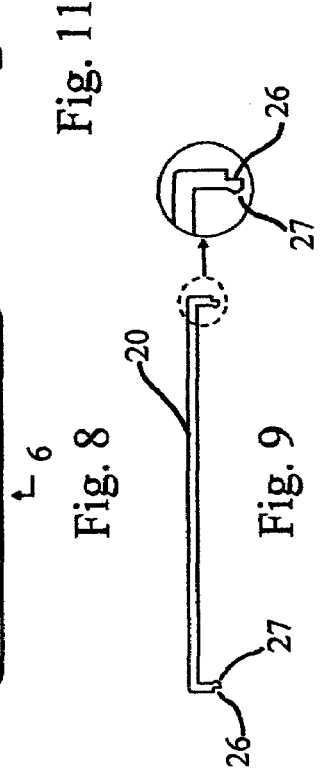
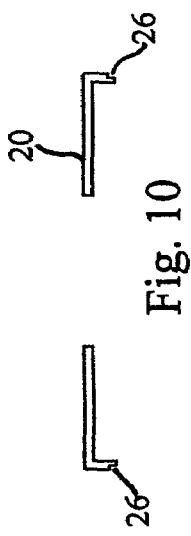
Fig. 12
Fig. 11
Fig. 8
Fig. 9
Fig. 10

DECORATIVE SWITCH ASSEMBLY

CROSS-REFERENCE TO RELATED APPLICATIONS

U.S. application Ser. Nos. 10/910,122 and 10/973,902.

FEDERALLY SPONSORED RESEARCH

Not Applicable

SEQUENCE LISTING OR PROGRAM

Not Applicable

BACKGROUND OF THE INVENTION

1. Field of Invention

A decorative switch assembly for outlet boxes wherein the switch actuator and the face plate are metallic and screwless. The cost of the assembly is low.

2. Background of the Invention

Outlet boxes such as electrical switches and electrical outlets are normally installed at eye-catching places in a room where people can see and use them conveniently. Therefore, electrical devices for outlet boxes providing up-scale looks are called for decorative purposes.

Efforts have been taken to obtain metallic appearance for wall plates. However, there is no invention at prior art trying to make the whole unit of a switch assembly in combination of the covering plate to have screwless and metallic appearance. As to metallic wall plates, most plates are made of a single piece of steel plate or cast metal. They are screw visible. Decorative screwless wall plates made of plastic at prior art do not attach grounding metals. To certain wall box mounted devices, grounding is required for having metal-to-metal contacts.

In addition to the whole unit of the switch assembly, the present invention also provides a decorative cover plate assembly for existing wall box mounted devices to have screwless and metallic appearance in a very low cost. None of the inventions and patents at prior art, taken either singly or in combination, is seen to describe the present invention as claimed.

SUMMARY OF THE INVENTION

The first objective of the present invention is to provide a decorative switch assembly with metallic appearance wherein no screws are visible.

The second objective of the present invention is to provide a switch covering assembly having a metal-to-metal grounding system.

The third objective of the present invention is to provide a 3-piece cover plate assembly having screwless and metallic appearance in low cost.

The foregoing objectives are met by a switch assembly comprising a base plate, a middle plate and a decorative metal face plate with the switch actuator having metallic appearance.

BRIEF DESCRIPTION OF THE DRAWINGS

FIG. 2 is a front elevation view of the base plate shown in FIG. 1;

FIG. 3 is a sectional view of the base plate shown in FIG. 2 taken along the line 1-1;

FIG. 4 is a sectional view of the base plate shown in FIG. 2 taken along the line 2-2;

FIG. 5 is a sectional view of the base plate shown in FIG. 2 taken along the line 3-3;

FIG. 6 is a perspective view of the base plate, showing the support surfaces where U-shaped sheet metals are to be attached;

FIG. 7 is a perspective view of the base plate with U-shaped sheet metals attached;

FIG. 8 is a front elevation view of the middle plate shown in FIG. 1;

FIG. 9 is a sectional view of the middle plate shown in FIG. 8 taken along the line 4-4, showing the snap at the back side and the notch at the front side;

FIG. 10 is a sectional view of the middle plate shown in FIG. 8 taken along the line 5-5, showing the notch at the front side;

FIG. 11 is a sectional view of the middle plate shown in FIG. 8 taken along the line 6-6;

FIG. 12 is a perspective view of the middle plate shown in FIG. 1, showing the lateral opening for disassembling purpose;

Figure 1:
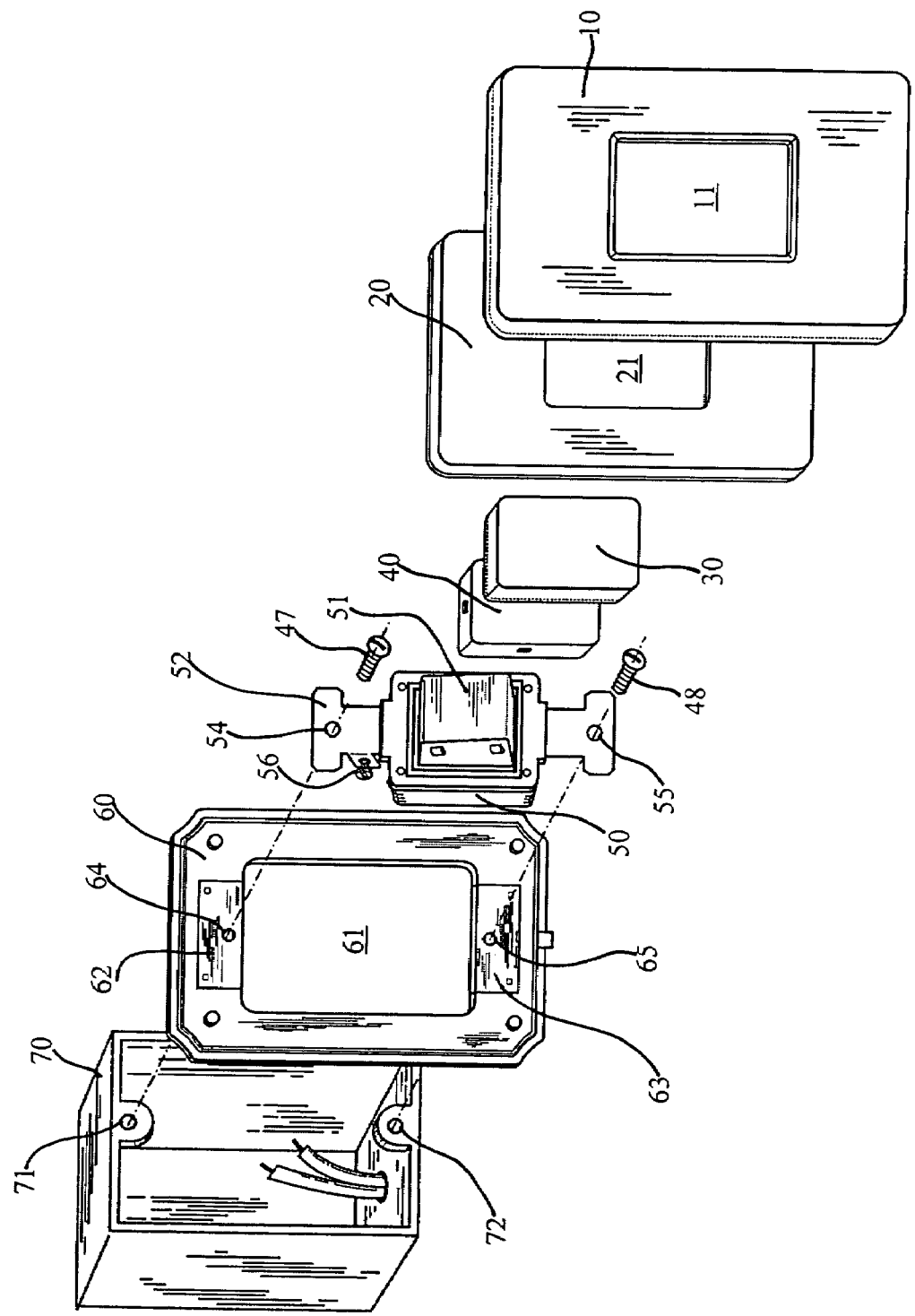
FIG. 1 is an exploded perspective view of a preferred embodiment of the present invention for a decorative switch assembly.

| DRAWINGS - Reference Numerals | |
|---|---|
| 10 | metal face plate |
| 11 | opening |
| 12 | lateral opening |
| 14 | snap |
| 20 | middle plate |
| 21 | opening |
| 22 | lateral opening |
| 26 | notch |
| 27 | snap |
| 30 | metal actuating plate |
| 40 | plastic actuating plate |
| 47 and 48 | screw |
| 50 | switch device |
| 51 | actuator |
| 52 | metal yoke plate |
| 54 and 55 | screw opening |
| 56 | grounding connector |
| 60 | base plate |
| 61 | opening |
| 62 and 63 | U-shaped sheet metal |
| 64 and 65 | screw opening |
| 66 | notch |
| 67 | tab |

-continued

DRAWINGS - Reference Numerals

| | |
|---|---|
| 68 and 69 | support surface |
| 70 | wall box |
| 71 and 72 | threaded screw holes |
| 80 | base plate |
| 90 | middle plate |
| 100 | metal face plate |

DESCRIPTION OF PREFERED EMBODIMENTS

The present invention will be described in detail by reference to the drawings. The drawings are for illustration and are not intended to limit the scope of the invention.

Referring first to FIG. 1, an exploded perspective view of a preferred embodiment of the present invention for a decorative switch assembly is shown; Switch device (50) is carried by metal yoke plate (52) mounted onto wall box (70) between base plate (60) and middle plate (20). Base plate (60) has a large central opening (61) adapted for receiving switch device (50). Base plate (60) is dimensioned to cover the wall opening for a standard wall box. Base plate (60) is made of plastic material. Two pieces of U-shaped sheet metals (62) and (63) are attached on base plate (60) for grounding purpose.

There are two screw openings at metal yoke plate (52) with the center-to-center spacing matching screw openings (64) and (65) and threaded screw holes (71) and (72) at wall box (70). Screws (47) and (48) pass through screw openings (54) and (55) at switch device (50) and screw openings (64) and (65) at base plate (60), respectively, and are threaded into screw holes (71) and (72) of wall box (70) to fasten both switch device (50) and base plate (60) to wall box (70) at the same time. Metal yoke plate (52) has a grounding connector (56). Metal yoke plate (52) contacts U-shaped sheet metals (62) and (63). U-shaped sheet metals (62) and (63) contact wall box 70. This provides a metal-to-metal contact for grounding when the wall box 70 is metal.

Actuator (51) of switch device (50) is made of flame retardant material and has snaps for attaching to a plastic actuating plate (40). Plastic actuating plate (40) has snap attachment means at both back side and front side. The snap attachment means at the back side of plastic actuating plate (40) is for attaching to actuator (51). The snap attachment means at the front side of plastic actuating plate (40) is for attaching to a decorative metal actuating plate (30). Alternatively, decorative metal actuating plate 30 can be affixed to plastic actuating plate 40 by adhesive means.

Middle plate (20) has snap attachment means at both back side and front side. The snap attachment means at the back side is for attaching middle plate (20) to base plate (60). The snap attachment means at the front side is for attaching middle plate to decorative metal face plate (10). There is an opening (21) at middle plate (20) adapted for metal actuating plate (30) to extend through.

Metal face plate (10) has snap attachment means along the periphery of the plate for attaching to middle plate (20). In order to smoothly attach metal face plate (10) to middle plate (10), adhesive is also used to secure the engagement. Therefore, metal face plate (10) is pressed into middle plate (20) for interlocking engagement together with adhesive means. Opening (11) at metal face plate (10) is adapted to permit metal actuating plate (30) to extend through.

As it is seen, the present invention provides the whole unit of the switch assembly with metallic and screwless appearance. The assembly provides a good grounding solution in low cost. The metallic plate with screwless appearance provides up-scale looks for eye-catching house decoration.

As a matter of fact, the assembly of base plate 60 and middle plate 20 without metal face plate (10) is also a good decorative covering assembly for wall box mounted devices. At such an embodiment, middle plate 20 becomes the face plate. A plastic base plate of a covering assembly having U-shaped sheet metals for grounding is not seen in prior art.

FIG. 2 is a front elevation view of base plate (60) shown in FIG. 1. The center-to-center spacing of the screw openings (64) and (65) are the same of that for threaded screw holes at a standard wall box. FIG. 3 is a sectional view of base plate (60) shown in FIG. 2 taken along the line 1-1. This shows the notch (66) for interlocking engagement with middle plate (20). FIG. 4 is a sectional view of base plate (60) shown in FIG. 2 taken along the line 2-2, showing notch (66) and opening (61). FIG. 5 is a sectional view of base plate (60) shown in FIG. 2 taken along the line 3-3, showing notch (66). FIG. 6 is a perspective view of base plate (60), showing the support surfaces (68 and 69) where U-shaped sheet metals (62 and 63) are to be attached. U-shaped sheet metals (62) and (63) are clipped onto the support surfaces (68) and (69) at this preferred embodiment. They can also be affixed to the base plate by adhesive means. Tab (67) is aligned to the lateral opening at the middle plate for disassembly purpose FIG. 7 is a perspective view of base plate (60) with U-shaped sheet metals (62) and (63) attached. U-shaped sheet metals (62) and (63) at base plate (60) provide solutions for "metal-to-metal contact" grounding connection when the wall box is metal. The U-shaped sheet metal can be made of stainless steel or galvanized steel plate or other metal materials with good conductivity for electricity.

FIG. 8 is a front elevation view of middle plate (20) shown in FIG. 1. Opening (21) is adapted for metal actuating plate (30) to pass through. FIG. 9 is a sectional view of middle plate (20) shown in FIG. 8 taken along the line 4-4, showing snap (27) at the back side and notch (26) at the front side. Snap (27) is used for interlocking engagement with base plate (60). Notch (26) is used for interlocking engagement with metal face plate (10). FIG. 10 is a sectional view of middle plate (20) shown in FIG. 8 taken along the line 5-5, showing notch (26) at the front side. FIG. 11 is a sectional view of middle plate (20) shown in FIG. 8 taken along the line 6-6. FIG. 12 is a perspective view of middle plate (20) shown in FIG. 1, showing lateral opening (22). Lateral opening (22) is adapted to a screwdriver head for disassembly purpose. Middle plate (20) is made of flame retardant material such as polycarbonate.

Figure 16:
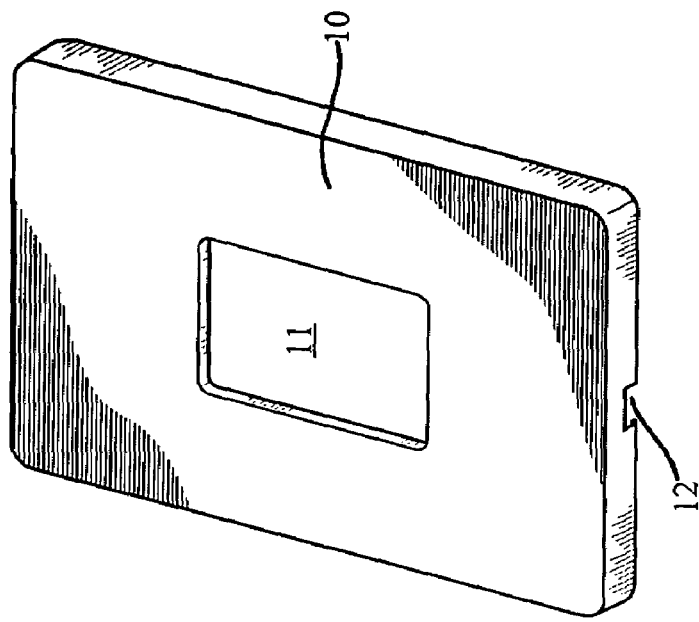
FIG. 16 is a perspective view of the metal face plate, showing the lateral opening for disassembling purpose.
Figure 15:
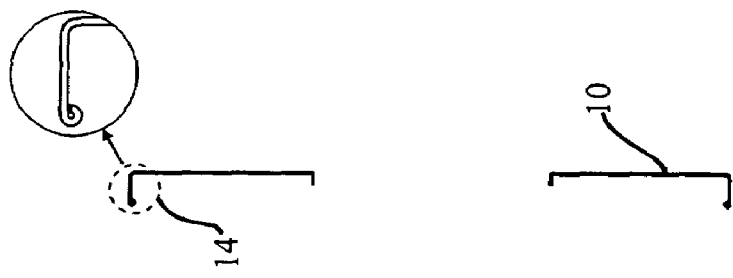
FIG. 15 is a sectional view of the metal face plate shown in FIG. 13 taken along the line 8-8.
Figure 13:
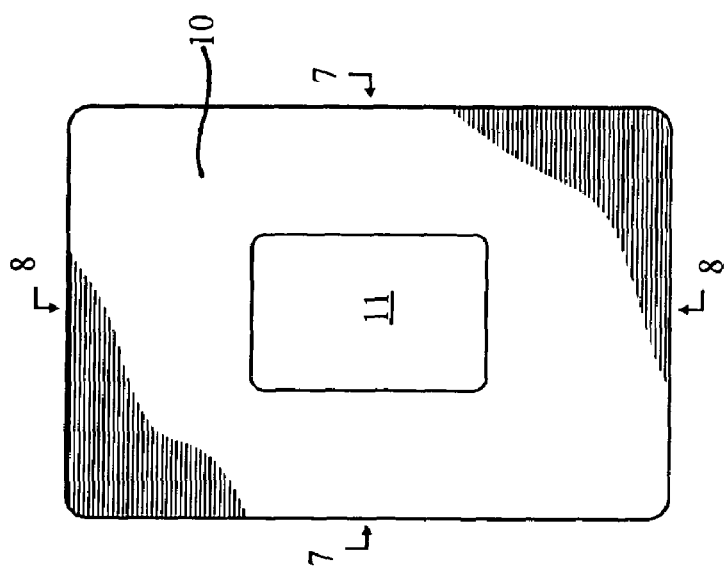
FIG. 13 is a front elevation view of the metal face plate shown in FIG. 1.
Figure 14:
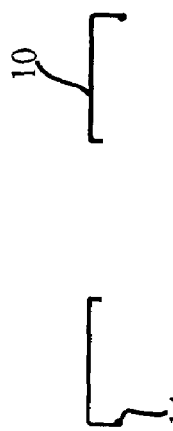
FIG. 14 is a sectional view of the metal face plate shown in FIG. 13 taken along the line 7-7.

FIG. 13 is a front elevation view of metal face plate (10) shown in FIG. 1. Opening 11 is adapted for actuator (51) covered by metal actuating plate (30) to extend through. FIG. 14 is a sectional view of metal face plate (10) shown in FIG. 13 taken along the line 7-7. FIG. 15 is a sectional view of metal face plate (10) shown in FIG. 13 taken along the line 8-8. FIG. 16 is a perspective view of metal face plate (10), showing lateral opening (12). Lateral opening (12) is aligned to lateral opening (22) at middle plate (20) adapted to a screwdriver head for disassembly purpose. Metal face plate (10) is made of sheet metal less than 0.5 mm thick for decorative purpose. The edge of metal plate (10) is inwardly rolled. Metal face plate (10) can be affixed to the middle plate (20) by adhesive means. In order to reduce cost, thin sheet metal is used for metal face plate. Therefore, adhesive is also used to secure the engagement when metal face plate is pressed into middle plate for interlocking engagement.

Figure 18:
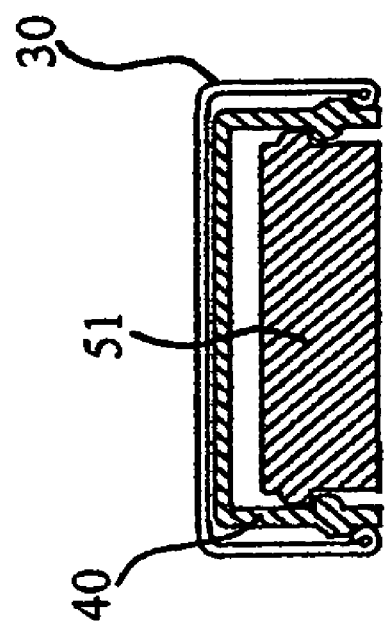
FIG. 18 is a sectional view of the switch actuator assembly showing the interrelations among the actuator, the plastic actuator plate and the metal actuator plate.
Figure 17:
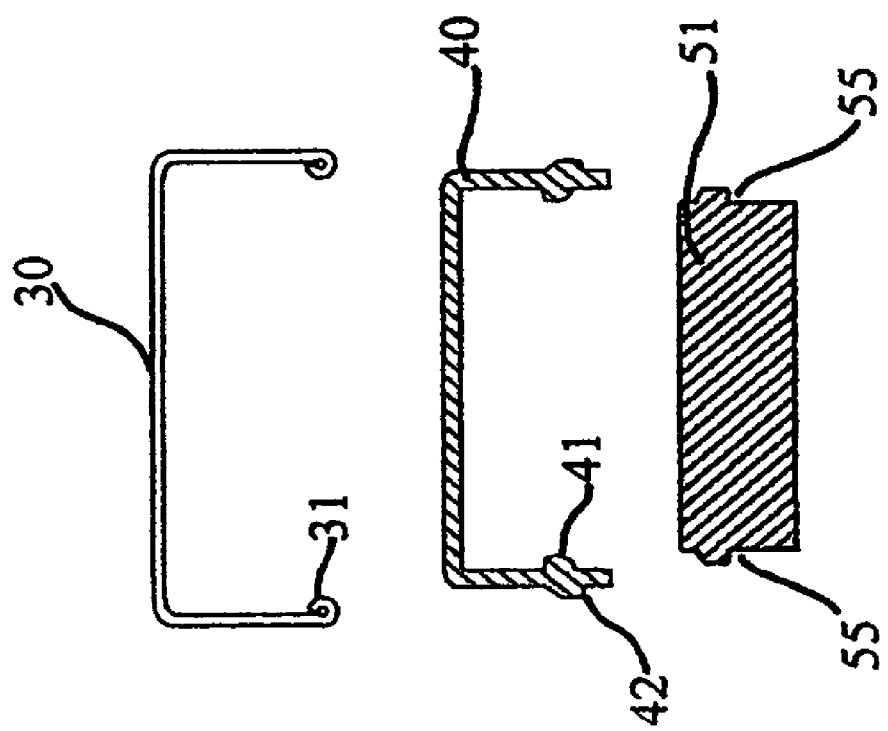
FIG. 17 is an exploded perspective view of the decorative switch actuator assembly.

FIG. 17 is an exploded perspective view of the decorative switch actuator assembly. Switch actuator (51) is covered by plastic actuator plate (40). Plastic actuator plate (40) is covered by metal actuator plate (30). FIG. 18 is a sectional view of the switch actuator assembly showing the interrelations among actuator (51), plastic actuator plate (40) and metal actuator plate (30). Plastic actuating plate (40) is simply pressed into actuator (51) for snap-fit interlocking engagement. Metal actuating plate (30) is simply pressed into plastic actuating plate (40) for snap-fit interlocking engagement. Metal actuating plate is made of a very thin sheet metal for decorative purpose. Plastic actuating plate (40) is made of flame retardant material such as polycarbonate.

The metallic appearance of the switch actuator together with the metallic and screwless appearance of the metal face plate for a switch assembly is not seen in prior art.

Figure 19:
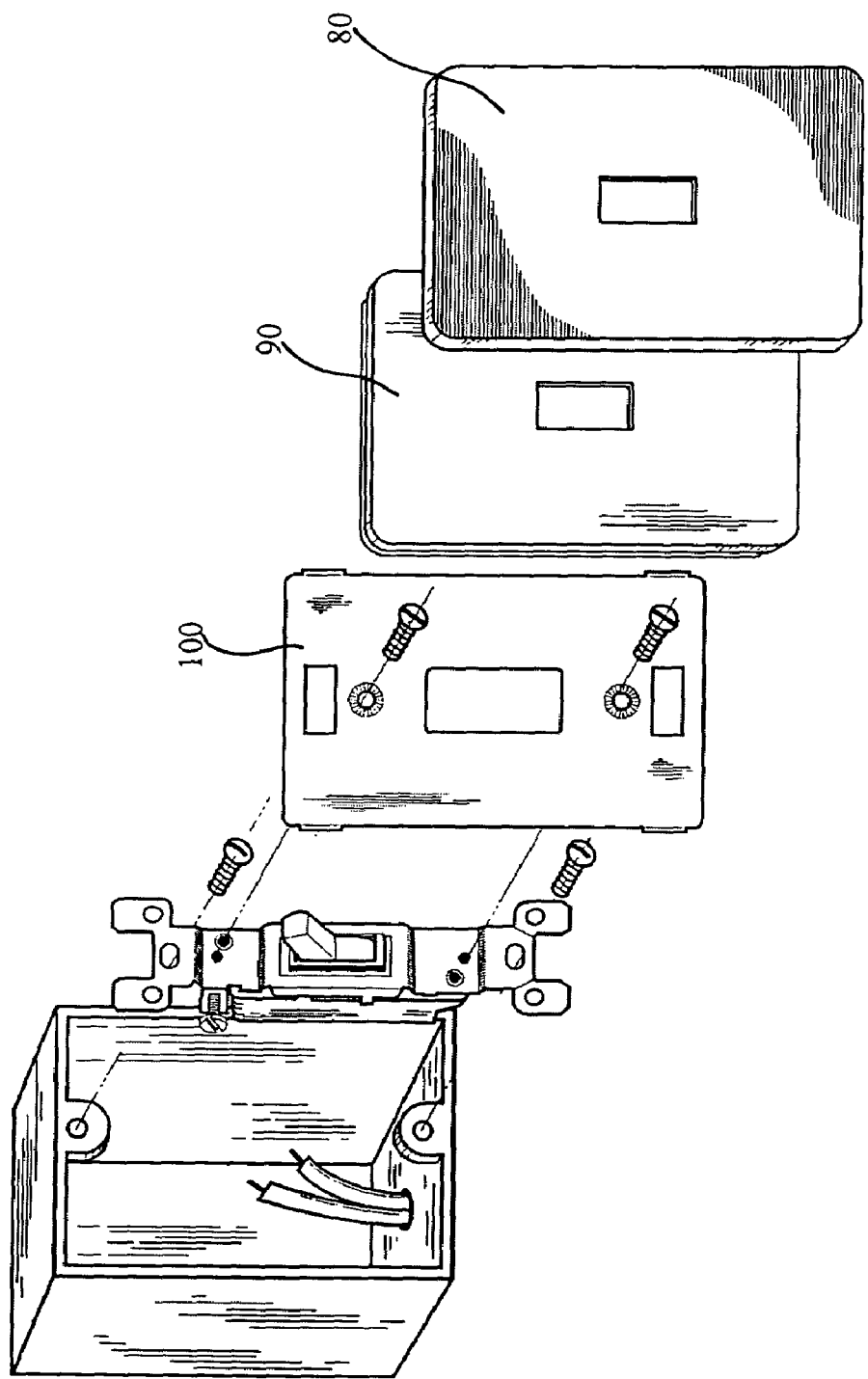
FIG. 19 is an exploded perspective view of an alternative embodiment of the present invention for a 3-piece decorative wall plate assembly, showing the assembly installed on a toggle switch.

FIG. 19 is an exploded perspective view of an alternative embodiment of the present invention for a 3-piece decorative covering assembly, showing the assembly installed on a toggle switch providing metallic and screwless appearance. Base plate (100) is mounted onto the switch device. Middle plate (90) is pressed into base plate (100) for snap-fit interlocking engagement. Metal face plate (80) is made of think sheet metal in order to reduce the cost. Metal face plate (80) is pressed into middle plate (90) for snap-fit interlocking engagement together with adhesive means in order to secure the engagement. The 3-piece cover plate assembly with the face plate showing metallic and screwless appearance is not seen in prior art.

While certain preferred and alternative embodiments of the invention have been set forth for purposes of disclosure, modifications to the disclosed embodiments as well as other embodiments thereof may occurred to those skilled in the art. Accordingly, the appended claims are intended to cover all embodiments of the invention and modifications thereof which do not depart from the spirit and scope of the invention.

What is claimed is:

1. In combination, a 3-piece decorative cover plate assembly and a wall box mounted device with metallic and screwless appearance:
   said wall box device (50) having an attached metal yoke plate (52) with a grounding connector (56); said metal yoke plate having two round openings (54 and 55) with the center-to-center spacing matching that of the two round openings (64 and 65) of a base plate (60) and that of the two threaded screw holes (71 and 72) in said wall box (70) which receives the base plate and said device; said device having an actuator (51) with attachment means for attaching to a plastic actuating plate (40); said plastic actuating plate having attachment means for attaching to the actuator and having attachment means for attaching to a metal actuating plate (30); said metal actuating plate is attached to the plastic actuating plate by adhesive means; said base plate (60) having one opening (61) adapted for accommodating the device; at least two screw openings (64 and 65) with the center-to-center spacing matching that of the threaded screw holes (71 and 72) in said wall box for mounting the base plate to the wall box; at least two support surfaces (68 and 69) attached with at least two U-shaped sheet metals (62 and 63) for supporting the device and for grounding purpose; and attachment means for attaching to a middle plate (20); the middle plate having one opening (21) adapted for the metal actuating plate (30) of the device to extend through; at least one lateral opening (22) for disassembly; and attachment means for interlocking engagement with the base plate (60); and the metal face plate (10) which is affixed to the middle plate by adhesive means having one opening (11) adapted for the metal actuating plate (30) of the device to extend through.

\* \* \* \* \*